United States Patent [19]

Wallbaum

[11] 3,969,156

[45] July 13, 1976

[54] METHOD OF MAKING DISPERSION STRENGTHENED PRODUCTS

[75] Inventor: Hans-Joachim Wallbaum, Osnabruck, Germany

[73] Assignee: Kabel-und Metallwerke Gutehoffnungshutte Aktiengesellschaft, Hannover, Germany

[22] Filed: Apr. 23, 1975

[21] Appl. No.: 570,592

[52] U.S. Cl. .............................. 148/11.5 R; 72/258; 72/363; 148/12.7 R
[51] Int. Cl.² ..................... B23P 3/00; C22F 1/08
[58] Field of Search ........... 29/199; 148/34, 11.5 Q, 148/11.5 C, 12.7 R, 12.7 C; 228/115; 72/258, 363

[56] References Cited
UNITED STATES PATENTS

| 2,471,663 | 5/1949 | Tietz | 29/199 |
| 2,625,737 | 1/1953 | Spooner | 29/199 |
| 3,251,660 | 5/1966 | Finsterwalder | 29/199 |
| 3,717,511 | 2/1973 | Wallbaum | 148/11.5 C |

FOREIGN PATENTS OR APPLICATIONS

| 599,167 | 5/1960 | Canada | 228/115 |

*Primary Examiner*—W. Stallard
*Attorney, Agent, or Firm*—Ralf H. Siegemund

[57] ABSTRACT

Sheet metal or strips are rolled and heated for dispersion hardening. Disks are cut (punched), stacked, and extruded. The disks in the stack may alternate with disks which have not yet been hardened. Subsequent heat treatment of the extruded product strengthens it throughout. The method is used specifically to make a dispersion-strengthened copper alloy to be used for making electrodes for resistance welding.

10 Claims, No Drawings

METHOD OF MAKING DISPERSION STRENGTHENED PRODUCTS

BACKGROUND OF THE INVENTION

The present invention relates to a method of making semi-finished products and other objects using a material which has been strengthened by means of dispersion hardening.

Metallurgy and the physics of metals have taught the development of methods for controlling the properties of metal to be used as raw material for specific purposes. However, it is common knowledge that a change in one property affects other properties of the material, and an improvement of one is quite often accompanied by a deterioration of others. Thus, the balance of properties is often a compromise.

Take, for example, copper as a typical historical example. It has good thermal and electrical properties, but it is mechanically poor. Copper has been strengthened (already in ancient times), but the electrical and thermal properties deteriorate e.g. upon alloying. Of course, that depends to some extent on the method used for strengthening.

Metals have been strengthened e.g. hardened in various ways, such as by deformation of the structure during cold working, (strain hardening); strengthening by mixed crystal; precipitation hardening; strengthening by fiber reinforcement; and strengthening by means of dispersion, i.e. by causing dispersion and inclusion of particularly hard particles in the metal.

An essential function of either method is to impede any movement of dislocations in the crystal structure. Strengthening and hardening by dispersion operates on the principle that embedded particles (impurities) impede the migration and movement of dislocations in the crystal structure. These particles prevent such migration during deforming as well as during annealing at temperature above the recrystallization temperature. The impediment is so strong that even at temperatures up to 90% of the absolute melting point neither recrystallization nor a reduction of the tensile strength can be observed. Upon deforming (working) dislocations are stopped by the embedded particles and can pass only when the acting forces (stress) is greatly increased. The migration of grain boundaries is prevented in the same manner, even at very high temperatures so that growth of grains is, in fact, suppressed.

Strengthening of metal by means of dispersion hardening is considerably better than cold working or the mixed crystal method, because the strength is actually improved to a greater extent and the electrical properties e.g. of copper deteriorate to a lesser degree.

A disadvantage of the dispersion method is that e.g. oxygen requires a long time to diffuse into the solid copper. By way of example, sufficiently dense and homogenic internal oxidation in a copper-aluminum alloy requires periods for diffusion of the oxygen in the order of 100 hours per cm wall thickness and at temperatures of about 1000°C.

A paper published in "Metall", Vol. 24, of May 1970, issue No. 5, page 465, et seq. proposes dispersion hardening of thinner metal parts and compacting them subsequently.

DESCRIPTION OF THE INVENTION

It is an object of the present invention to propose a method of making dispersion-strengthened (hardened) materials in an economic manner.

It is a specific object of the present invention to improve a method in which sheet stock or strips of a particular material is to be rolled first and subsequently heated (annealed) in an oxidizing atmosphere to disperse oxygen therein.

In accordance with the preferred embodiment of the invention, the thus treated sheet or strip stock is used to punch out circles or disks, pile them one above the other and extrude the pile. Alternatively, punching may precede the dispersion. In either case, the blank for extrusion is a stack of disks at least some of which are completely or partially dispersion-hardened. As a consequence of the extrusion the several layers or lamina combine metallurgically during the extrusion and the result is a compact length of dispersion-hardened metal as a semi-finished product, e.g. a rod. The sheet stock or strips are rolled down to be quite thin, so that the dispersion process will not take too long to penetrate the entire material.

The method can be practiced in various ways. For example, not all of the assembled disks have to be punched from dispersion-hardened sheets or strips, but the hardened disks may be interspersed with disks which are amenable to hardening by thermal treatment, e.g. to precipitation hardening. Generally then, the different sets of disks may be different alloys of the same base metal permitting different ways of hardening. A heat treating process followed in turn by "aging" may be carried out after the extrusion.

In lieu of such disks, the material of which is hardened in such a subsequent process, one may use disks of the pure metal and alternate them with the strengthened disks to maximize the specific properties for which the particular metal was chosen in the first place (e.g. copper for high electrical and thermal conductivities). As a consequence, a rod is produced, which, in cross-section, consists of concentric annuli of differing consistency and, therefore, different properties.

The dispersion-strengthened disks may have been made from (or by) metal in which the inclusion and dispersed particles occur in surface layers only. The diffusion takes less time in such a case, and the alternation is inherent.

Concentric lamination of properties results in a semi-finished product that is very strong, and strength is little reduced with rising temperature. One may, for example, make copper disks and alternate them in the stack with dispersion-hardened copper alloy disks. The resulting product has an electric conductivity which is little less than for pure copper; thermal conductivity follows the same rule. Generally, the physical properties (other than strength) of the dispersion strengthened materials vary only about proportional to the volumetric ratio of the dispersed phase.

The alternation of stacking disks of differing consistency does not necessarily mean that one disk of one type follows one another and vice versa. Rather, one may readily control the volumetric properties and distribution of dispersed inclusions by choosing a different ratio in that one disk is followed in the stack always by two or more disks of the other type. A more detailed property control is obtained by different penetration depth of the dispersed inclusions in the surface of the disks, a wide range is available here, from a thin surface layer to full penetration.

The extrusion can be carried out in a number of different ways. The stack of disks may be placed into the barrel of the extruder, so that the disk facing the die is of pure copper. This rather ductile front end of the blank protects the die against excessive wear. One can also stack the disks into a copper tube having the height of the stack; close it, suck the air out and replace it by a protective gas, and then the copper tube and disks stacks are extruded together. The resulting rod will have an outer jacket of pure copper. The protective gas is, for example, argon.

In the case of copper as base metal a stack of such disks includes disks made of a dispersion-hardened alloy of copper and disks of a copper alloy that can be strengthened by heat treatment. Upon extruding this stack of mixed disks, all of the alloying elements of the disks of the second set are put into solution in the copper. It is advisable to quench the extruded rod in water, and to cut lengths therefrom for annealing at temperatures from 400° to 550°C to obtain precipitation hardening.

It was found that electrodes for resistance welding can be made with advantage in the afore-described manner. Specifically, one will provide disks in which 0.5 to 1.5% aluminum has been alloyed with copper and dispersion-strengthened. A second set of disks is made of a copper alloy that includes 0.6% chromium and 0.2% zirconium (all percentages by weight). The two sets of disks are intermingled, so that different types of disks e.g. alternate in sequence in the assembled stack. That stack is placed into a copper tube, and the assembly is extruded. Quenching and heat treatment in the stated temperature range follow for precipitation hardening of the chromium zirconium portion in the extruded rod.

The following is a specific example which has been practiced with advantage. A copper alloy with 0.5% aluminum was rolled to obtain sheets of 1 mm thickness. These sheets were placed in an air circulating furnace and annealed for about 5 hours at about 900°C under normal pressure. Disks of, for example, 270 mm diameter were punched out of these sheets. The diameter had to match the diameter of the recipient of the extruder.

A second set of disks of similar diameter was prepared in the following manner. A strip had been made by rolling and at a thickness of 1 mm. The strip consisted of copper alloyed with 0.6% chromium and 0.2% zirconium. Disks were punched from the strip. This material can readily be strengthened by precipitation hardening.

A stack was prepared in which the dispersion strengthened disks alternated in sequence with the copper — chromium — zirconium disks, which were not dispersion-strengthened. The stack was placed into a copper tube of like internal diameter and with a wall thickness of about 3 mm. The air was driven out of that tube and replaced by argon as protective gas.

Next, the stack-in-the-tube was heated to about 1000°C and extruded. The resulting rod was introduced into (cold) water for quenching. The rod was cut into lengths or sections and these parts were subsequently annealed (aging process) at 400° to 550°C for about one hour whereby particularly the copper-chromium-zirconium alloy portion was hardened by precipitation of the alloying substances. The final step was a cold working step to obtain the desired shape.

By means of the invention, semi-finished products can be produced which combine the strength properties of dispersion-hardened material with the properties of a precipitation-hardened material and/or of a pure metal.

The specific method outlined above can be used to make electrodes for electrical resistance welding consisting of a dispersion strengthened copper alloy and a precipitation strengthened copper alloy. These electrodes have particularly mechanical strength and low temperatures on account of the precipitation hardened copper—chromium—zirconium alloy. However, the strength is reduced very little with rising temperatures, and that is the specific advantage and attributable to the dispersion-hardened portion. Moreover, the dispersed particles reduces electrical and conductivities of the alloy very little which, of course, is beneficial in that electrical currents produce little heating and whatever heat is developed is readily removed.

The invention is not limited to the embodiments described above, but all changes and modifications thereof not constituting departures from the spirit and scope of the invention are intended to be included.

I claim:

1. Method of making dispersion-hardened objects, comprising the steps of:
   providing a sheet or strip of metal amenable to dispersion strengthening;
   punching disks from the sheet or strip;
   annealing the disks or sheet or strip in an oxidizing atmosphere;
   stacking the disks as a blank assembly; and extruding the blank.

2. Method as in claim 1, wherein the dispersion affects a relatively thin surface layer of the metal only.

3. Method as in claim 1 and including the steps of providing additional disks of a metal amenable to hardening by thermal treatment and stacking them in alternating sequence to obtain the blank.

4. Method as in claim 3, wherein the first mentioned disks and the additional disks are different alloys of the same metal.

5. Method as in claim 4, wherein the metal is copper and including the step of quenching wherein the extruded copper product and annealing the quenched product at a temperature from 400° to 550°C.

6. Method as in claim 1, wherein the metal is a copper alloy, the method including the steps of providing additional disks of a different copper alloy or pure copper and stacking them in alternating sequence to obtain the blank.

7. Method as in claim 6, wherein the disk of the blank facing an extruder die when placed therein is of pure copper.

8. Method as in claim 1 and including the steps of providing additional disks of the pure metal and stacking them in alternating sequence to obtain the blank, the first mentioned disks being an alloy of that metal.

9. Method as in claim 1 and including the step of quenching the extruded product and annealing the quenched product for tempering.

10. Method as in claim 1 and including the step of placing or assembling the stack in a copper tube having a height of the stack; using a copper alloy as the metal; and replacing air in the tube by a protective gas, the tube with stacked disks being the blank extruded.

* * * * *